United States Patent [19]

Masuyama et al.

[11] Patent Number: 5,631,062
[45] Date of Patent: May 20, 1997

[54] MAGNETIC RECORDING MEDIUM

[75] Inventors: Kenichi Masuyama; Hiroaki Takano; Kazuo Kato; Kazuko Hanai; Noburo Hibino, all of Kanagawa, Japan

[73] Assignee: Fuji Photo Film Co., Ltd., Kanagawa, Japan

[21] Appl. No.: 248,246

[22] Filed: May 24, 1994

[30] Foreign Application Priority Data

May 24, 1993 [JP] Japan ..................... 5-121671

[51] Int. Cl.$^6$ ..................... G11B 5/66; G11B 5/70
[52] U.S. Cl. ............ 428/141; 428/143; 428/694 B; 428/694 BS; 428/694 BR; 428/694 ST; 428/694 SL; 428/694 SG; 428/900
[58] Field of Search .............. 428/694 ST, 694 SL, 428/694 SG, 694 BS, 694 BN, 695 BR, 694 B, 141, 143, 900

[56] References Cited

U.S. PATENT DOCUMENTS

| | | | |
|---|---|---|---|
| 4,590,119 | 5/1986 | Kawakami et al. | 428/216 |
| 4,613,520 | 9/1986 | Dasgupta | 427/128 |
| 4,664,975 | 5/1987 | Kobayashi et al. | 428/323 |
| 4,687,700 | 8/1987 | Hensel et al. | 428/213 |
| 5,206,084 | 4/1993 | Takeda et al. | 428/336 |
| 5,281,472 | 1/1994 | Takahashi et al. | 428/336 |
| 5,318,823 | 6/1994 | Utsumi et al. | 428/143 |
| 5,366,783 | 11/1994 | Utsumi et al. | 428/141 |

FOREIGN PATENT DOCUMENTS

| | | |
|---|---|---|
| 58-71922 | 4/1983 | Japan . |
| 63-308059 | 12/1988 | Japan . |

*Primary Examiner*—Paul J. Thibodeau
*Assistant Examiner*—Stephen Sand
*Attorney, Agent, or Firm*—Sughrue, Mion, Zinn, Macpeak & Seas

[57] ABSTRACT

A magnetic recording medium comprising a nonmagnetic support and a magnetic layer, wherein the magnetic layer is provided on one surface of the nonmagnetic support, comprises a ferromagnetic particle, and has a surface roughness of from 2 to 10 nm; the nonmagnetic support has plural layers; at least one layer of the plural layers comprises an antistatic agent; and the nonmagnetic support has a surface roughness of from 5 to 30 nm on the opposite surface to the surface on which the magnetic layer is provided.

5 Claims, No Drawings

MAGNETIC RECORDING MEDIUM

FIELD OF THE INVENTION

The present invention relates to a so-called backless magnetic recording medium comprising a nonmagnetic support composed of plural layers and having no back coating layer, and particularly to a magnetic recording medium high in recording density and high in reliability.

BACKGROUND OF THE INVENTION

With recent developments in magnetic recording, the magnetic recording media which can reproduce images and sounds of higher quality have been strongly demanded. In order to meet these demands, a reduction in the particle size of the ferromagnetic particles and an increase in the density of the magnetic recording media have hitherto been promoted. Further, since the magnetic recording media are consumed in large amounts, they have been required to be produced at a lower cost. One technique to meet these demands is to provide a plurality of the magnetic layers. This technique is advantageous for increasing the density in that shorter-wavelength recording characteristics can be imparted to an upper layer and longer-wavelength recording characteristics can be imparted to a lower layer, thereby using suitable ferromagnetic particles in the respective layers. In the use for shorter-wavelength recording alone, the upper magnetic layer must be decreased in thickness and a nonmagnetic particle must be used in the lower layer, thereby diminishing self-demagnetization, which advantageously results in a higher-density recording medium. At the same time, the recording medium having plural magnetic layers has a feature that the medium can be produced at a low cost because suitable materials can be used depending upon the respective layers. Recently, methods for improving the surface properties of the magnetic layers, or ferromagnetic particles high having output and low noise have been required to improve electromagnetic characteristics.

On the other hand, such electromagnetic characteristics of the magnetic recording media should be evaluated on the condition that the magnetic recording media have good running ability above a certain level. In order to secure good running ability, therefore, the surfaces of the magnetic layers and the backing layers of the magnetic recording media have been required to be low in the coefficient of friction. For electrification which is the main cause of drop out or an output defect, it has been necessary that the magnetic recording media are hard to be charged.

That is, the requirements for the present magnetic recording media are as follows:

(1) the magnetic recording media have excellent electromagnetic characteristics;

(2) the magnetic recording media are hard to be charged;

(3) the magnetic recording media have excellent running durability; and (4) the magnetic recording media have excellent productivity.

First, a surface of the magnetic layer is required to be made as smooth as possible (for example, JP-A-57-130234 (the term "JP-A" as used herein means an "unexamined published Japanese patent application") and JP-A-61-168124). For this purpose, a base surface on which the magnetic layer is formed is required to be very smooth. In particular, when the magnetic layers are formed in a multiple-layer structure, a surface of a nonmagnetic support on which the magnetic layers are formed influences the surface properties of the lower magnetic layer, which further influences the surface properties of the upper magnetic layer. Accordingly, the surface properties of the surface of the nonmagnetic support on which the magnetic layers are formed is important, and the surface is required to be smooth. Further, in order to obtain excellent electromagnetic characteristics, magnetic substances are required to be high in output and low in noise.

Next, electrification of a magnetic recording tape induced by sliding the tape on a loading guide for the tape and a cylinder in a VTR or on cassette members in a cassette causes easy adhesion of a powder falling from the tape itself, a powder produced from the cassette members or a surface of the tape by wear due to the contact of the tape with the cassette members and dust from the outside to the tape, which results in partial space loss on recording and reproduction of a magnetic head, leading to a drop-out failure. For the purpose of preventing this, a reduction in the surface electrical resistance of the surfaces of the magnetic layers (for example, JP-A-59-16140 and JP-A-59-63029) and a reduction in the surface electrical resistance of the back coating layers formed on the surfaces opposite to the surfaces of the nonmagnetic supports on which the magnetic layers are formed (for example, JP-A-57-150132 and JP-A-59-3722) have been known. However, the formation of the back coating layers requires the step of forming the back coating layers and the development of back coating solutions, resulting in a high production cost, and brings about powder dropping and separation of the back coating layers on repeated use, resulting in deteriorated durability.

SUMMARY OF THE INVENTION

An object of the present invention is therefore to provide a magnetic recording medium which is excellent in electromagnetic characteristics, low in the coefficient of friction of the back surface, little in generation of scratches and abrasion particles by repeated running, and low in electrification, leading to little drop out produced by adhesion of dust to the medium.

Another object of the present invention is to provide a magnetic recording medium which is high in recording density and high in reliability.

In order to attain the above-described objects, the present inventors have conducted intensive investigations into magnetic recording media having no back coating layer, namely magnetic recording media in which nonmagnetic supports themselves constitute back surfaces, particularly into the layer constitution of the nonmagnetic supports of the magnetic recording media, the antistatic treatment thereof and the surface roughness thereof.

These and other objects of the present invention can be achieved by a magnetic recording medium comprising a nonmagnetic support and a magnetic layer, wherein the magnetic layer is provided on one surface of the nonmagnetic support, comprises a ferromagnetic particle, and has a surface roughness of from 2 to 10 nm; the nonmagnetic support has plural layers; at least one layer of the plural layers comprises an antistatic agent; and the nonmagnetic support has a surface roughness of from 5 to 30 nm on the opposite surface to the surface on which the magnetic layer is provided.

Preferably, these and other objects of the present invention can be achieved by the above-described magnetic recording medium, wherein the antistatic agent is at least one selected from the following (1), (2) and (3):

(1) polyalkylene glycol;
(2) sulfonic acid metal salt derivative; and
(3) at lease one of aromatic amine and ammonium salt thereof.

Further, these and other objects of the present invention can be achieved by a magnetic recording medium comprising a nonmagnetic support, an lower layer and a magnetic layer, wherein the lower layer is provided on one surface of the nonmagnetic support and comprises an inorganic particle and carbon black; the magnetic layer is provided on the lower layer, comprises a ferromagnetic particle, and has a surface roughness of from 2 to 10 nm; the nonmagnetic support has plural layers; at least one layer of the plural layers comprises an antistatic agent; and the nonmagnetic support has a surface roughness of from 5 to 30 nm the opposite surface to the surface on which the magnetic layer is provided.

Further preferably, these and other objects of the present invention can be achieved by the above-described magnetic recording medium, wherein the antistatic agent is at least one selected from the following (1), (2) and (3):

(1) polyalkylene glycol;
(2) sulfonic acid metal salt derivative; and
(3) at lease one of aromatic amine and ammonium salt thereof; and the ferromagnetic particle is a ferromagnetic alloy particle.

DETAILED DESCRIPTION OF THE INVENTION

One of the features of the present invention is that the magnetic layer has a surface roughness of from 2 to 10 nm, and that the nonmagnetic support has a surface roughness of from 5 to 30 nm on the opposite surface to the surface on which the magnetic layer is provided. The smoother the surface of the magnetic layer is, the more improved electromagnetic characteristics such as output the magnetic recording medium has. On the other hand, it is known that the surface of the nonmagnetic support opposite to the surface on which the magnetic layer is provided is preferably as smooth as possible, because the unevenness of the surface of the nonmagnetic support is transferred to the surface of the magnetic layer, when the magnetic layer is brought into contact with the surface of the nonmagnetic support opposite to the surface on which the magnetic layer is provided, for example, when the magnetic recording medium is stored in the overlapped state. However, if the surface is too smooth, the tape is damaged by sliding on a guide on running of a VTR, or the guide is stained. Edge damage is also likely to take place.

Then, another feature of the present invention is that the antistatic agent is directly incorporated in the nonmagnetic support without forming a back coating layer on the surface of the nonmagnetic support, thereby exhibiting the antistatic effect while maintaining the original high durability of the nonmagnetic support. Namely, the surface properties of the nonmagnetic support are improved to increase the friction coefficient. Even if the surface of the support is subject to strong forces, no scratch is produced because of its high durability. When a powder is generated or floats in the air, it does not adhere to the magnetic recording medium. Accordingly, the dropout after repeated running is not deteriorated. On running of the VTR, therefore, the tape is not damaged by sliding on the guide, or the guide is not stained. Also, edge damage does not take place.

A further feature of the present invention is that the above-described support contains at least one of the following (1) to (3) as the antistatic agent:

(1) polyalkylene glycol;
(2) sulfonic acid metal salt derivative; and
(3) aromatic amine and/or ammonium salt thereof.

The polyalkylene glycol shown in (1) is an antistatic agent, and also has lubricity. The sulfonic acid metal salt derivative shown in (2) and the aromatic amine and/or the ammonium salt thereof shown in (3) are powerful antistatic agents. These compounds exhibit their effect when used alone. However, they are preferably used in combination to obtain a support more excellent in antistatic property and lubricity.

Thus, the present invention is characterized in that above-described nonmagnetic support has plural layers, and that at least one of the above-described layers contains the antistatic agent. The antistatic agent may therefore be comprised in all of the layers or some of them. When the antistatic agent is incorporated in some of the layers, it is preferably comprised in at least the surface layer of the nonmagnetic support opposite to the surface on which the magnetic layer is provided. This is because addition of the antistatic agent to at least a place at which the antistatic effect is desired to be exhibited, namely to the surface layer of the nonmagnetic support, results in sufficient exhibition of the antistatic effect at a minimized amount of the antistatic agent used. When the antistatic agent is comprised in all the layers of the nonmagnetic support, the guide is likely to be stained on running of the VTR, and edge damage is also likely to take place. For the layer structure of the support, therefore, the ratio of the layers not subjected to antistatic treatment to the layers subjected thereto is preferably from 9.5/0.5 to 3/7, and more preferably from 9/1 to 5/5.

Examples of the nonmagnetic support used in the present invention include a polyethylene-2,6-naphthalate film (PEN), a 4-6 nylon aramide film, and a PBO film, in particular, a polyester film. Such polyester film can be obtained by polycondensing an aromatic dicarboxylic acid (e.g., terephthalic acid, isophthalic acid, naphthalene-2,6-dicarboxylic acid) or ester thereof with glycol (e.g., ethylene glycol, diethylene glycol, tetramethylene glycol, neopentyl glycol).

The polyester is also obtained by conducting ester interchange reaction between aromatic dicarboxylic acid dialkyl ester and glycol, followed by polycondensation, or by polycondensing aromatic dicarboxylic acid ester as well as by direct polycondensation of an aromatic dicarboxylic acid with glycol. Typical examples of such polymer include polyethylene terephthalate and polyethylene naphthalate.

Examples of the polyalkylene glycol used in the present invention include polyethylene glycol, polypropylene glycol and polytetramethylene glycol each having an average molecular weight of 400 or more. Polyethylene glycol having an average molecular weight of from 1,000 to 20,000 is preferred. The polyalkylene glycol is added to the nonmagnetic support film, such as a polyethylene-2,6-naphthalate film (PEN), a 4-6 nylon aramide film and a PBO film, preferably in an amount of from 0.1 to 20 parts by weight, more preferably from 0.5 to 10 parts by weight, based on 100 parts by weight of the nonmagnetic support film. When the polyalkylene glycol is added in an amount of less than 0.1 part by weight, it is not preferred because scratches due to a guide pole on repeated running are likely to generate. On the other hand, when it is added in an amount of more than 20 parts by weight, it is not preferred because mechanical properties and heat resistance are deteriorated.

Examples of the sulfonic acid metal salt derivative used in the present invention include an organic sulfonic acid metal salt having a functional group forming an ester bond (e.g., sodium 5-sulfoisophthalate, potassium 5-sulfoisophthalate, sodium 3,5-di(carbo-β-hydroxyethoxy)benzenesulfonate) and an alkyl aromatic sulfonic acid metal salt (e.g., sodium nonylbenzenesulfonate, sodium dodecylbenzenesulfonate, sodium decylbenzenesulfonate, sodium stearylbenzenesulfonate, sodium octylnaphthalenesulfonate, sodium nonylnaphthalenesulfonate, sodium dodecylnaphthalenesulfonate, potassium nonylnaphthalenesulfonate, potassium dodecylnaphthalenesulfonate, potassium stearylnaphthalenesulfonate). Of these, sodium dodecylbenzenesulfonate and sodium 5-sulfoisophthalate are preferably used. The sulfonic acid metal salt derivative is added preferably in an amount of from 0.05 to 20 parts by weight, more preferably from 0.1 to 10 parts by weight, based on 100 parts by weight of the nonmagnetic support film. When the sulfonic acid metal salt derivative is added in an amount of less than 0.05 part by weight, it is not preferred because scratches due to the guide pole on repeated running are likely to generate. On the other hand, when it is added in an amount of more than 20 parts by weight, it is not preferred because mechanical properties are deteriorated.

The aromatic amine used in the present invention is preferably a tertiary amine. Examples thereof include N,N-dimethylaniline, N,N-diethylaniline, N,N-dibutylaniline, N,N-dibenzylaniline, N,N-diethyl-o-toluidine, N,N-diethyl-m-toluidine, N,N-diethyl-p-N-methyldiphenylamine, N,N-benzyl-N-ethylaniline, triphenylamine and N,N,N,N-tetramethyl-p-phenylenediamine. Examples of the ammonium salt thereof used in the present invention include salts of the above-described amines with a fatty acid such as carbonic acid and acetic acid, or with a hydrohalogenic acid. Of these, triphenylamine and N,N,N,N-tetramethyl-p-phenylenediamine are preferred. The aromatic amine and/or salt thereof are added preferably in an amount of from 0.01 to 2.0 parts by weight, more preferably in an amount of from 0.01 to 1.0 part by weight, based on 100 parts by weight of the nonmagnetic support film. When the aromatic amine and/or salt thereof are used in an amount of less than 0.01 part by weight, it is not preferred because scratches due to the guide pole on repeated running are generated. On the other hand, they are added in an amount of more than 2.0 parts by weight, it is not preferable because mechanical properties are deteriorated.

These antistatic agents are added to the surface layer of the nonmagnetic support opposite to the magnetic layers, whereby the anti-scratching property to the guide pole on repeated running, in addition to the antistatic property, can be improved. This is probably because the film stiffness of the nonmagnetic support can be appropriately softened, which results in decreased scratches against scratching forces on the surface of the nonmagnetic support when it is scratched on the guide pole.

In the film used as the nonmagnetic support in the present invention, it is preferred that the surface layer of the nonmagnetic support opposite to the surface in contact with the magnetic layer has a specified number of projections having a specified height on the film surface, particularly preferably by addition of particles of $CaCO_3$, $SiO_2$, $Al_2O_3$ and an organic filler. The projections improve the durability and the anti-scratching property of the tape.

In general, the larger size and the larger number of the projections formed on the film surface by addition of $CaCO_3$, $SiO_2$ and the organic filler have, the lower friction coefficient to improve the anti-scratching property the magnetic recording medium has. However, the surface roughness (Ra) is reduced to deteriorate the electromagnetic characteristics.

The height and the number of the projections can be controlled by the particle size and the amount of $CaCO_3$ or $SiO_2$ to be added. The size of $CaCO_3$, $SiO_2$ and the organic filler is preferably from 0.3 to 0.8 μm. A size of less than 0.3 μm thereof provides insufficient durability, whereas a size of more than 0.8 μm thereof results in inferior surface properties to deteriorate the electromagnetic characteristics. The particle size of $Al_2O_3$ is preferably 0.2 μm or less, and more preferably 0.1 μm or less. A size of more than 0.2 μm thereof reduces the anti-scratching effect of the base film.

The friction coefficient of the surface of the nonmagnetic support, particularly the polyester film, of the magnetic recording medium is preferably 0.30 or less.

The polyester film used in the present invention may be one in which a layer containing the above-described inorganic particles is provided on at least one side of a biaxial oriented thermoplastic film.

Further, the above-described nonmagnetic support has plural layers, and a lubricating agent is provided on the surface layer of the nonmagnetic support opposite to the surface on which the above-described magnetic layer is provided, thereby giving the effect of preventing scratches on the tape support layer and powder dropping therefrom on repeated running. Examples of the above-described lubricating agent include a fatty acid, fatty acid ester, a silicon compound and a fluorine lubricating agent.

The magnetic recording medium of the present invention can be produced, for example, in the following manner. The lower inorganic particle layer is formed on the nonmagnetic support, followed by magnetic field orientation treatment, drying treatment and calendering treatment, if necessary. Then, the upper magnetic layer is formed thereon, followed by magnetic field orientation treatment, drying treatment and calendering treatment, thus forming the magnetic layer-coated film.

However, a method called the "wet-on-wet coating system" (disclosed in U.S. Pat. No. 4,844,946) is particularly preferred in which the upper magnetic layer is provided on the lower inorganic powder layer concurrently or sequentially while the lower layer is still in a wet state.

The lower inorganic powder layer in the magnetic recording medium of the present invention is a layer in which inorganic particles are dispersed in binders. The inorganic particles used in the present invention include known ferromagnetic particles such as $\gamma\text{-}Fe_2O_3$, Co-containing FeOx ($1.33 \leq x \leq 1.48$), FeOx ($1.33 \leq x \leq 1.48$), $CrO_2$, a Co—Ni—P alloy and an Fe—Co—Ni alloy, and nonmagnetic powders such as $TiO_2$, $BASO_4$, $ZnO_2$, $\alpha\text{-}Fe_2O_3$ and carbon black. They may be used alone or in combination.

In particular, the ferromagnetic particles or the nonmagnetic particles can be used properly as the inorganic particles for the upper layers, depending upon the requirement and use of a magnetic recording system.

The upper magnetic layer in the magnetic recording medium of the present invention is preferably a layer in which ferromagnetic alloy particles are dispersed in binders. The ferromagnetic alloy particles used in the present invention include alloys having at least 75% by weight of metal ingredients, 80% by weight or more of the metal ingredients being at least one ferromagnetic metal Or alloy (for example, Fe, Co, Ni, Fe—Co, Fe—Ni, Co—Ni, Co—Ni—Fe), and the metal ingredients being capable of containing other components (for example, Al, Si, S, Sc, Ti, V, Cr, Mn, Cu, Zn, Y, Mo, Rh, Pd, Ag, Sn, Sb, Te, Ba, Ta, W, Re, Au, Hg, Pb, Bi, La, Ce, Pr, Nd, B, P) within a range of less than 20% by weight of the metal ingredients; and iron nitride. The ferromagnetic alloy particles preferably contain Al or Si or both. Further, the above-mentioned ferromagnetic metals may contain a small amount of water, hydroxides or oxides. Methods for producing these ferromagnetic metal particles are already known, and the ferromagnetic alloy particles, typical examples of the ferromagnetic particles used in the present invention, can be produced according to these known methods.

That is, examples of the methods for producing the ferromagnetic alloy particles include the following methods:

(a) a method in which a complex organic acid salt (mainly an oxalic acid salt) is reduced with a reducing gas such as hydrogen;

(b) a method in which iron oxide is reduced with a reducing gas such as hydrogen to obtain Fe or Fe—Co particles;

(c) a method in which a metal carbonyl compound is thermally decomposed;

(d) a method in which a reducing agent such as sodium borohydride, hypophosphate or hydrazine is added to an aqueous solution of a ferromagnetic metal to conduct reduction;

(e) a method in which a ferromagnetic metal particle is electrolytically precipitated by the use of a mercury cathode, followed by separation from mercury; and (f) a method in which a metal is vaporized in a low-pressure inert gas to obtain a fine particle.

When the ferromagnetic alloy particle is used, the shape thereof is not particularly limited. However, acicular, granular, dice-like, polyhedral and plate-like particles are usually used. The metal particles obtained by these methods suffer unfavorable rapid oxidation on contact with the air. It is therefore preferred to use gradual oxidation methods in which oxide layers are formed on surfaces of the powders for stabilization. Such methods include a method in which a metal particle is immersed into an organic solvent in an inert gas, followed by evaporation of the solvent and drying in the air, and a method in which a mixed gas of an oxygen gas and an inert gas having a low oxygen partial pressure is introduced in an inert gas to increase the oxygen pressure gradually, and finally the air is passed.

The coercive force of the ferromagnetic alloy particle in the most upper layer is preferably from 600 to 5,000 Oe (oersted), and more preferably 1,000 to 2,500 Oe. A coercive force of less than 600 Oe results in an unfavorable deterioration of electromagnetic characteristics in a short wavelength region, whereas a coercive force of more than 5,000 Oe makes it impossible to record with a normal head. Further, it is preferred that the ferromagnetic alloy particle has a specific surface area in accordance with the BET method of 40 $m^2/g$ or more, an average longer diameter of 0.25 µm or less, an acicular ratio of 12 or less and a crystallite size of from 150 to 300 angstroms. Without the ranges described above, noise is unfavorably made loud, and a C/N ratio is unfavorably lowered. Furthermore, the saturation magnetization ($\sigma_s$) is preferably from 100 to 160 emu/g.

The thickness of the most upper layer is preferably 1 µm or less, and more preferably 0.8 µm or less. When the thickness of the most upper layer is more than 1 µm, the effect of the multiple-layer structure is unfavorably reduced.

In the present invention, abrasive is preferably used. Although the abrasive to be used is not particularly limited, abrasive having a Mohs' hardness of 6 or more, preferably 8 or more, are employed. Examples thereof include MgO (Mohs' hardness: 6), $Cr_2O_3$ (Mohs' hardness: 8.5), $\alpha$-$Al_2O_3$ (Mohs' hardness: 9), $\gamma$-$Al_2O_3$ (Mohs' hardness: 7 to 8) and SiC ($\alpha$ or $\beta$, Mohs' hardness: 9.5). The particle size thereof is preferably from 0.01 to 1.50 µm, and more preferably 0.1 to 0.8 µm. The abrasive content is preferably from 0.3 to 10 parts by weight, more preferably from 0.5 to 5 parts by weight, based on 100 parts by weight of the ferromagnetic particle. The abrasives different in kind or particle size may be used as mixtures if desired. It is particularly preferred that the above-described abrasives are used in the upper magnetic layer.

As a means for reducing the electrification of a magnetic layer, there is the method of decreasing the electric resistance of the magnetic layer by adding carbon black to the magnetic layer as described above. However, carbon black is a nonmagnetic particle. Accordingly, when it is added in an increased amount, the magnetic characteristics are lowered, resulting in deteriorated electromagnetic characteristics. In the case of magnetic layer having the multiple-layer structure, however, an increased amount of carbon black can be added only to the lower inorganic particle layer, and a minimized amount of carbon black or no carbon black can be added to the upper magnetic layer, thereby compatibly preventing the electromagnetic characteristics from being deteriorated and lowering the electrification. Examples of the carbon black used in the present invention includes furnace for rubbers, thermal for rubbers, coloring black and acetylene black. The average particle size of the carbon black used in the present invention is preferably from 5 to 100 mµ, and more preferably 5 to 50 mµ. An average particle size of more than 100 mµ results in the insufficient effect of lowering the surface electric resistance. The carbon black is added preferably in an amount of from 5 to 50% by weight based on the ferromagnetic powder. When the carbon black is added in an amount of less than 5% by weight, the effect of lowering the surface electric resistance is insufficient. When the carbon black is added in an amount of more than 50% by weight, the electromagnetic characteristics are deteriorated. Such carbon black is commercially available under the trade names of VULCAN XC-72, BP905 and BP800 manufactured by Cabot Co., Ltd.; CONDUCTEX SC manufactured by Colombia Carbon Co., Ltd.; Asahi #50, #55, #70 and #80 manufactured by Asahi Carbon Co., Ltd.; and 950B, 3250B and 650B manufactured by Mitsubishi Kasei Corporation.

A binder solution for producing a magnetic coating composition used in the present invention comprises a resin component and a solvent, and further comprises other additives such as a lubricating agent, if desired.

Examples of the resin component include a thermoplastic resin, a thermosetting resin, a reactive resin and a mixture thereof which are conventionally used. Specific examples of the resin component include a vinyl chloride copolymer (for example, vinyl chloride-vinyl acetate copolymer, vinyl chloride-vinyl acetate-vinyl alcohol copolymer, vinyl chloride-vinyl acetate-acrylic acid copolymer, vinyl chloride-vinylidene chloride copolymer, vinyl chloride-acrylonitrile copolymer, ethylene-vinyl acetate copolymer, epoxy group-introduced vinyl chloride copolymer), a cellulose derivative (for example, nitrocellulose resin, acrylic resin, polyvinyl acetal resin, polyvinyl butyral resin, epoxy resin, phenoxy resin, polyurethane resin, polycarbonate polyurethane resin). It is preferred that these resins contain polar groups such as —COOH, —$SO_3Na$, —$OSO_3H$, —$SO_2Na$, —$PO_3Na_2$ and —$OPO_3H_2$.

When curing agents are used, a polyisocyanate compound is generally used. The polyisocyanate compound is selected from the compounds generally used as a curing component for polyurethane resins.

Further, when curing treatment is conducted by electron beam irradiation, the compound having a reactive double bond (for example, urethane acrylate) can be used.

Examples of the solvent used for the production of the magnetic coating composition include ketone such as acetone, methyl ethyl ketone, methyl isobutyl ketone, ethyl isobutyl ketone and cyclohexanone; ester such as methyl acetate, ethyl acetate, butyl acetate and glycol acetate monoethyl ether; ether such as ether, glycol dimethyl ether and dioxane; aromatic hydrocarbon such as benzene, toluene and xylene; and chlorinated hydrocarbon such as methylene chloride, ethylene chloride, carbon tetrachloride, chloroform, ethylene chlorohydrin and dichlorobenzene. These solvents can be used alone or in combination. Polar solvents such as ketone or solvents containing polar solvents are particularly preferred.

In producing the magnetic coating composition, the ferromagnetic particle is homogeneously kneaded with the binder solution to disperse the powder therein. For this dispersion by kneading, methods are generally utilized in which the powder is pre-dispersed by the use of a two-roll mill, a three-roll mill, an open kneader, a pressure kneader or a continuous kneader, and then after-dispersed by the use of a sand grinder or a ball mill.

Any of various additives such as lubricating agents and dispersing agents may be added, of course, to the magnetic coating composition according to the conventional techniques depending on their purpose.

Examples of the method Which can be utilized for applying the magnetic coating composition include air doctor coating, blade coating, rod coating, extrusion coating, air knife coating, squeeze coating, impregnation coating, reverse roll coating, transfer roll coating, gravure coating, kiss coating, cast coating, spray coating and spin coating. For the details of the coating methods, *The Newest Coating Techniques* published by Sogo Gijutsu Center, Japan, can be referred to.

In particular, preferred examples of the apparatus and methods for coating the magnetic recording medium having the double-layer constitution include extrusion coating methods described in JP-B-1-46186 (the term "JP-B" as used herein means an "examined Japanese patent publication"), JP-A-62-95174, JP-A-63-88080, JP-A-60-238179, JP-A-1-236968, JP-A-2-17971, JP-A-2-26567, JP-A-2-174965 and JP-A-2-265672.

The methods for producing the magnetic recording media of the present invention have hereinbefore been described for the double-layer system composed of the upper and lower layers. However, the number of the magnetic layers may be three or more as a whole, as long as the magnetic layers of the double-layer structure having the properties specified above are contained.

The magnetic layers formed on the support by such methods are subjected to treatment for orientating the ferromagnetic particles contained in the layers to desired directions with drying if necessary, and the formed magnetic layers are dried. At this time, the support is usually transferred at a speed of from 10 to 1,000 m/minute and at a drying temperature of from 20° to 130° C. Then, the resulting products are subjected to surface smoothing treatment and cut into desired shapes if necessary to produce the magnetic recording medium of the present invention. In these producing methods, it is preferred that the steps of surface treatment of the fillers, kneading, dispersing, coating, heat treatment, calendering, radiation (EB) treatment, surface polishing treatment and cutting are continuously conducted. Further, this may be divided into several steps as required. In these steps, the temperature is from 10° to 130° C. and the humidity is from 5 to 20 mg/m$^3$ when represented by the water content in the air.

The present invention is now illustrated in greater detail by reference to the following examples which, however, are not to be construed as limiting the invention in any way. In the following examples, parts are by weight, unless otherwise indicated.

EXAMPLES

Example 1

Coating Solution for Lower Layer
Ferromagnetic Particle

| | |
|---|---|
| Co-$\gamma$FeO$_x$ (x = 1.37, Hc = 800 Oe, S$_{BET}$ = 33 m$^2$/g) | 100 parts |

Binders

| | |
|---|---|
| Vinyl Chloride Copolymer (MR-110: containing an epoxy group and an —SO$_3$Na group, manufactured by Nippon Zeon Co., Ltd.) | 10 parts |
| Polyurethane (UR-8300: containing an —SO$_3$Na group, manufactured by Toyobo Co., Ltd.) | 5 parts |

Curing Agent

| | |
|---|---|
| Polyisocyanate (Coronate L-75: manufactured by Nippon Polyurethane Co., Ltd.) | 5 parts |

Additives

| | |
|---|---|
| Carbon Black (CONDUCTEX SC: average particle size: 20 mµ, manufactured by Colombia Carbon Co., Ltd.) | 10 parts |
| Stearic Acid (for industrial use) | 0.2 part |

Solvents

| | |
|---|---|
| Cyclohexanone | 50 parts |
| Methyl Ethyl Ketone | 100 parts |
| Toluene | 100 parts |

Coating Solution for Upper Layer
Ferromagnetic Particle

| | |
|---|---|
| Fe—Ni Alloy Particle (Hc = 1600 Oe, S$_{BET}$ = 40 m$^2$/g) | 100 parts |

Binders

| | |
|---|---|
| Vinyl Chloride Copolymer (MR-110: containing an epoxy group and an —SO$_3$Na group, manufactured by Nippon Zeon Co., Ltd.) | 10 parts |

| | |
|---|---|
| Polyurethane (UR-8300: containing an —SO₃Na group, manufactured by Toyobo Co., Ltd.) | 5 parts |

Curing Agent

| | |
|---|---|
| Polyisocyanate (Coronate L-75: manufactured by Nippon Polyurethane Co., Ltd.) | 5 parts |

Additives

| | |
|---|---|
| Carbon Black (Asahi Carbon #50: average particle size: 90 mμ, manufactured by Asahi Carbon Co., Ltd.) | 0.5 part |
| Stearic Acid (for industrial use) | 0.2 part |

Solvents

| | |
|---|---|
| Cyclohexanone | 50 parts |
| Methyl Ethyl Ketone | 100 parts |
| Toluene | 100 parts |

Each of the above-described compositions was kneaded with an open kneader, and then dispersed by the use of a sand mill to obtain a coating solution for a lower layer and a coating solution for an upper layer. The resulting coating solutions were applied to a surface of a polyethylene terephthalate film (A). Then, magnetic field orientation treatment, drying and super calender treatment were conducted, followed by slitting to a width of 8 mm to produce a video tape.

The polyethylene terephthalate film (A) has two layers, a surface on which the magnetic layers were provided having a surface roughness (Ra) of 6.0 nm, the opposite surface having a surface roughness (Ra) of 15 nm. The surface layer of the support opposite to the surface on which the magnetic layers had been provided was subjected to antistatic treatment to give a surface electric resistance of $1 \times 10^{11}$ Ω/sq.

Antistatic agents were added at the following ratio:

| | |
|---|---|
| Dimethyl Terephthalate | 100 parts |
| Ethylene Glycol | 60 parts |
| Polyethylene Glycol | 2 parts |
| Sodium Dodecylbenzenesulfonate | 1 part |

The thickness of the support was adjusted to give a ratio of the layer not subjected to antistatic treatment to the layer subjected thereto of 9/1.

Example 2

The sample was produced in the same manner as in Example 1, with the exception that a ferromagnetic alloy particle having a specific surface area of 50 m²/g was substituted for the ferromagnetic alloy particle of the upper magnetic layer in Example 1, and that the magnetic layer was formed as a single layer having a thickness of 2.5 μm.

Example 3

The sample was produced in the same manner as in Example 1, with the exception that a ferromagnetic alloy particle having a specific surface area of 60 m²/g was substituted for the ferromagnetic alloy particle of the upper magnetic layer in Example 1, and that the thickness of the support was adjusted to give a ratio of the layer not subjected to antistatic treatment to the layer subjected thereto of 7/3.

Example 4

The sample was produced in the same manner as in Example 1, with the exception that a ferromagnetic alloy particle having a specific surface area of 70 m²/g was substituted for the ferromagnetic alloy particle of the upper magnetic layer in Example 1, and that the thickness of the support was adjusted to give a ratio of the layer not subjected to antistatic treatment to the layer subjected thereto of 5/5.

Example 5

The sample was produced in the same manner as in Example 1, with the exception that $TiO_2$ (diameter: 35 mμ, specific surface area: 40 m²/g) was substituted for Co-γFeO$_x$ of the solution for the lower layer in Example 1.

Example 6

The sample was produced in the same manner as in Example 1, with the exception that acicular α-Fe$_2$O$_3$ (specific surface area: 50 m²/g, acicular ratio: 1/8) was substituted for Co-γFeO$_x$ of the solution for the lower layer in Example 1.

Example 7

The sample was produced in the same manner as in Example 6, with the exception that Ba ferrite was substituted for the ferromagnetic alloy particle of the upper magnetic layer in Example 6, and that the thickness of the support was adjusted to give a ratio of the layer not subjected to antistatic treatment to the layer subjected thereto of 8/2.

Examples 8 and 9

The samples were each produced in the same manner as in Example 1, with the exception that a ferromagnetic alloy powder having a specific surface area of 50 m²/g was substituted for the ferromagnetic alloy powder of the upper magnetic layer in Example 1, and that the surface properties (surface roughnesses) of the magnetic layer were changed by varying the calender treatment temperature.

Example 10

The sample was produced in the same manner as in Example 1, with the exception that a ferromagnetic alloy particle having a specific surface area of 60 m²/g was substituted for the ferromagnetic alloy particle of the upper magnetic layer in Example 1, and that the thickness of the support was adjusted to give a ratio of the layer not subjected to antistatic treatment to the layer subjected thereto of 3/7.

Example 11 and Comparative Example 1

The samples were each produced in the same manner as in Example 1, with the exception that a ferromagnetic alloy particle having a specific surface area of 50 m²/g was substituted for the ferromagnetic alloy particle of the upper magnetic layer in Example 1, and that the surface properties (surface roughnesses) of the magnetic layer were changed by varying the calender treatment temperature.

Comparative Examples 2 to 4

The samples were each produced in the same manner as in Example 1, with the exception that a ferromagnetic alloy particle having a specific surface area of 50 m²/g was substituted for the ferromagnetic alloy particle of the upper magnetic layer in Example 1, and that the size and amount of the filler contained in the surface layer of the support opposite to the surface on which the magnetic layers were provided were changed to give surface roughnesses of 3, 35 and 45 nm, respectively.

Measuring Conditions

Surface Electric Resistance:

The surface electric resistance was measured by the use of a digital surface electric resistance meter (TR-8611A manufactured by Takeda Riken Co., Ltd.) at 23° C. at 70% RH.

Surface Roughness:

For the samples (Examples 1 to 11 and Comparative Examples 1 to 5), the center line average roughness in a region of 250×250 nm² was measured by the MIRAU method, using a non-contact type surface roughness tester (TOPO3D manufactured by WYKO Co., LTD.).

Scratches after VTR Running:

The samples produced in Examples and Comparative Examples were each slitted to a width of 8 mm, and incorporated in a half for an 8-mm video cassette. Then, 500 running passes were repeated using an 8-mm VTR (FUJIX-M6, manufactured by Fuji Photo Film Co., Ltd.), and the tape surface (the surface of the nonmagnetic support opposite to the surface on which the above-described magnetic layer was provided) after running was observed at a magnification of from 1× to 400× under a microscope.

The evaluation was described by using the following marks.

| Very good (scratches are little observed) | o |
|---|---|
| Good | Δ |
| Bad | x |

Stain of Guide after VTR Running:

The samples produced in Examples and Comparative Examples were each slitted to a width of 8 mm, and incorporated in a half for an 8-mm video cassette. Then, 500 running passes were repeated using an 8-mm VTR (FUJIX-M6), and stain of a stationary guide mounted in the VTR and stain adhered to the tape surface (the surface of the nonmagnetic support opposite to the surface on which the above-described magnetic layer was provided) after running were observed at a magnification of from 1× to 400× under a microscope.

The evaluation was described by using the following marks.

| Very good (dirt is little observed) | o |
|---|---|
| Good | Δ |
| Bad | x |

Dropout after Repeated Running:

The dropout after 500 repeated running passes was measured using a 8-mm video tape recorder (V-S900 manufactured by Sony Corporation) and SHIBASOKU VHO1BZ dropout counter (manufactured by Shibasoku Co., Ltd.) under the conditions of 15 μS and −10 dB.

The evaluation was described by using the following marks.

| Very good (less than 20 dropouts/minute) | o |
|---|---|
| Good (20 to 100 dropouts/minute) | Δ |
| Bad (more than 100 dropouts/minute) | x |

Electromagnetic Characteristics:

The output level at a recording frequency of 7 MHz was measured, using an 8-mm video tape recorder (V-S900, manufactured by Sony Corporation) and 3585A Spectrum Analyzer manufactured by Hewlett Packard. The output level is shown by a relative value to a value of an 8-mm standard tape (FUJI-SAG, D6-120, manufactured by Fuji Photo Film Co., Ltd.) taken as 0 dB.

Adhesion:

The samples produced in Examples and Comparative Examples were each slitted to a width of 8 mm. After adhesive tape was stuck on the surface of the magnetic layer, the tape samples were fixed to a spring scale. The burden was measured as the adhesive ability when the tape was torn from the samples by 180 degrees.

The evaluation was described by using the following marks.

| Very good | o |
|---|---|
| Good | Δ |
| Bad | x |

Results obtained by the above-described evaluating methods are shown in Table 1.

TABLE 1

| | Magnetic Layer (Upper Layer) | | Inorganic Particle Layer (Lower Layer) | Support | | Back Surface |
|---|---|---|---|---|---|---|
| | Ferromagnetic Particle | Surface | Inorganic | Layer | | Surface |
| | Kind | BET (m²/g) | Roughness (nm) | Particle Kind | Constitution | Rs (Ω/sq) | Roughness (nm) |
| Example 1 | Alloy particle | 40 | 4.2 | Iron oxide | 9/1 | $2 \times 10^{11}$ | 15 |
| Example 2 | Alloy particle | 50 | 4.0 | — | 9/1 | $3 \times 10^{10}$ | 20 |
| Example 3 | Alloy particle | 60 | 5.5 | Iron oxide | 7/3 | $3 \times 10^{10}$ | 15 |
| Example 4 | Alloy particle | 70 | 6.0 | Iron oxide | 5/5 | $2 \times 10^{11}$ | 15 |
| Example 5 | Alloy particle | 60 | 2.5 | $TiO_2$ | 9/1 | $3 \times 10^{10}$ | 12 |
| Example 6 | Alloy particle | 60 | 3.0 | $\alpha\text{-}Fe_2O_3$ | 9/1 | $2 \times 10^{11}$ | 16 |
| Example 7 | Ba-Fe | 60 | 8.0 | $\alpha\text{-}Fe_2O_3$ | 8/2 | $2 \times 10^{10}$ | 14 |
| Example 8 | Alloy particle | 50 | 10 | Iron oxide | 9/1 | $5 \times 10^{11}$ | 15 |
| Example 9 | Alloy particle | 50 | 4.0 | Iron oxide | 9/1 | $2 \times 10^{15}$ | 5 |

TABLE 1-continued

|  |  |  |  |  |  |  |  |
|---|---|---|---|---|---|---|---|
| Example 10 | Alloy particle | 60 | 4.5 | Iron oxide | 3/7 | $5 \times 10^9$ | 20 |
| Example 11 | Alloy particle | 50 | 2.5 | Iron oxide | 9/1 | $2 \times 10^{11}$ | 16 |
| Comparative Example 1 | Alloy particle | 50 | 12 | Iron oxide | 9/1 | $2 \times 10^{11}$ | 12 |
| Comparative Example 2 | Alloy particle | 50 | 4.0 | Iron oxide | 9/1 | $2 \times 10^{13}$ | 3 |
| Comparative Example 3 | Alloy particle | 50 | 5.0 | Iron oxide | 9/1 | $8 \times 10^{10}$ | 35 |
| Comparative Example 4 | Alloy particle | 50 | 4.5 | Iron oxide | 9/1 | $2 \times 10^{11}$ | 45 |

|  | After VTR Running | | | Dropout after 100 Running Passes | Electromagnetic Characteristics Output (dB) | | Adhesion |
|---|---|---|---|---|---|---|---|
|  | Stain of Guide | Scratch | Edge Damage |  |  |  |  |
| Example 1 | o | o | o | 6 | 2.0 | o | o |
| Example 2 | o | o | o | 10 | 2.0 | o | o |
| Example 3 | o | o | o | 9 | 2.5 | o | o |
| Example 4 | o | o | Δ | 15 | 2.4 | o | o |
| Example 5 | o | o | o | 11 | 4.0 | o | o |
| Example 6 | o | o | o | 9 | 3.8 | o | o |
| Example 7 | o | o | o | 18 | 3.5 | o | o |
| Example 8 | o | o | o | 12 | 1.0 | Δ | o |
| Example 9 | o | oΔ | oΔ | 24 | 3.5 | o | o |
| Example 10 | o | o | o | 18 | 2.3 | o | o |
| Example 11 | o | o | o | 15 | 3.8 | o | o |
| Comparative Example 1 | x | o | o | 15 | −3.0 | x | o |
| Comparative Example 2 | x | x | x | 100 | 3.2 | o | o |
| Comparative Example 3 | o | o | o | 12 | −1.0 | x | o |
| Comparative Example 4 | o | o | o | 15 | −1.8 | x | o |

Note:
Alloy particle; Fe:Ni = 99:1; Iron oxide; Co-γFeO$_x$ x = 1.37.

As is apparent from the results shown in Table 1, the magnetic recording media according to the present invention obtained in Examples 1 to 12 are good in stain of the guide and scratches on VTR running, little in dropout after 500 running passes, and high in output.

As is described above, the magnetic recording medium comprises the nonmagnetic support having the magnetic layer comprising the ferromagnetic particle on one surface thereof, wherein the magnetic layer has a surface roughness of from 2 to 10 nm, the nonmagnetic support has plural layers, at least one layer of the plural layers comprises the antistatic agent, and the nonmagnetic support has a surface roughness of from 5 to 30 nm on the opposite surface to the surface on which the magnetic layer is provided; and particularly the antistatic agent is at least one of (1) polyalkylene glycol, (2) sulfonic acid metal salt derivative and (3) aromatic amine and/or ammonium salt thereof, thereby obtaining the magnetic recording medium which is excellent in electromagnetic characteristics, low in the friction coefficient of the back surface, little in generation of scratches and an abrasion powder due to repeated running, and low in electrification, leading to little drop out produced by adhesion of dust, etc. to the medium, and particularly the magnetic recording medium which is high in recording density and high in reliability.

While the present invention has been described in detail and with reference to specific embodiments thereof, it is apparent to one skilled in the art that various changes and modifications can be made therein without departing from the spirit and the scope of the present invention.

What is claimed is:

1. A magnetic recording medium comprising an organic or polymeric nonmagnetic support and a magnetic layer, wherein the magnetic layer is provided on one surface of the nonmagnetic support, comprises a ferromagnetic particle, and has a center line average surface roughness of from 2 to 10 nm;

the nonmagnetic support has plural layers;

at least one layer of the plural layers comprises an antistatic agent selected from the group consisting of polyalkylene glycol, sulfonic acid metal salt derivative, aromatic amine, ammonium salt of aromatic amine, and a mixture of an aromatic amine and an ammonium salt of an aromatic amine;

the antistatic agent is incorporated in at least the surface layer of the nonmagnetic support which is opposite to the magnetic layer; and said surface layer has a center line average surface roughness of from 5 to 30 nm.

2. The magnetic recording medium of claim 1, wherein the ratio of the layers of the nonmagnetic support not subject to antistatic treatment to the layers of the nonmagnetic support subjected to antistatic treatment is from 9.5/0.5 to 3/7.

3. A magnetic recording medium comprising an organic or polymeric nonmagnetic support, a lower layer and a magnetic layer, wherein the lower layer is provided on one surface of the nonmagnetic support and comprises an inorganic particle and carbon black;

the magnetic layer is provided on the lower layer, comprises a ferromagnetic particle, and has a center line average surface roughness of from 2 to 10 nm;

the nonmagnetic support has plural layers;

at least one layer of the plural layers comprises an antistatic agent selected from the group consisting of polyalkylene glycol, sulfonic acid metal salt derivative, aromatic amine, ammonium salt of aromatic amine and a mixture of an aromatic amine and an ammonium salt of an aromatic amine;

the antistatic agent is incorporated in at least the surface layer of the nonmagnetic support which is opposite to the magnetic layer; and said surface layer has a center line average surface roughness of from 5 to 30 nm.

4. The magnetic recording medium as claimed in claim 3, wherein the ferromagnetic particle is a ferromagnetic alloy particle.

5. The magnetic recording medium of claim 3, wherein the ratio of the layers of the nonmagnetic support not subject to antistatic treatment to the layers of the nonmagnetic support subjected to antistatic treatment is from 9.5/0.5 to 3/7.

* * * * *